United States Patent Office 2,791,270
Patented May 7, 1957

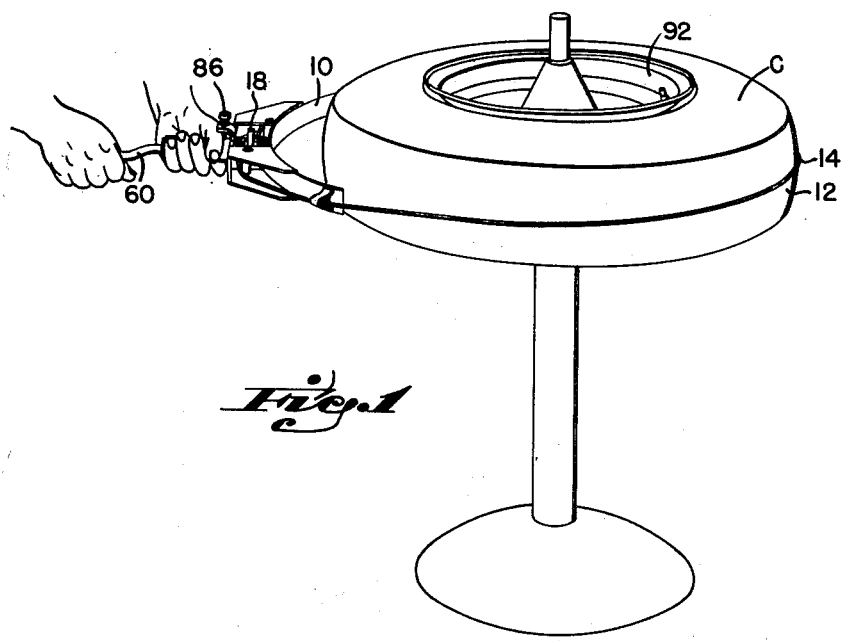
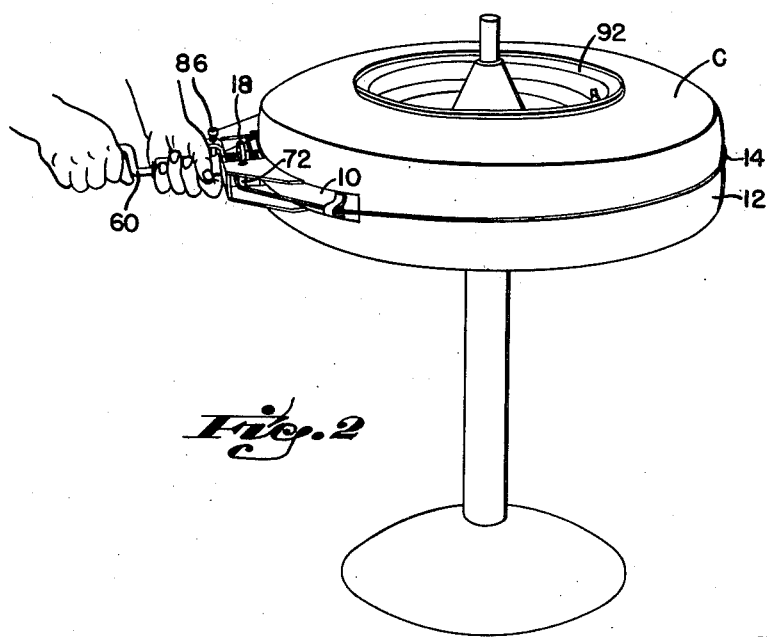

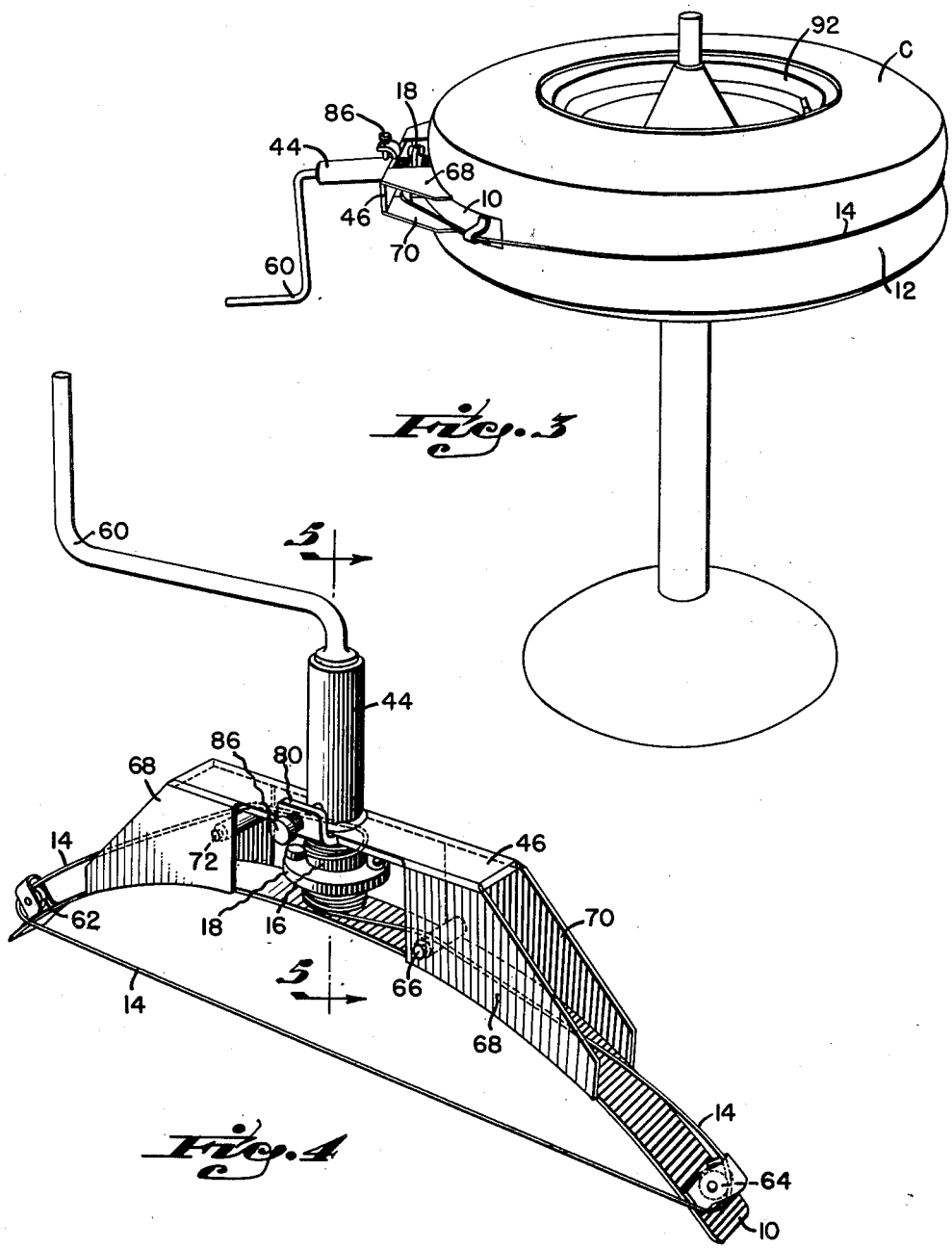

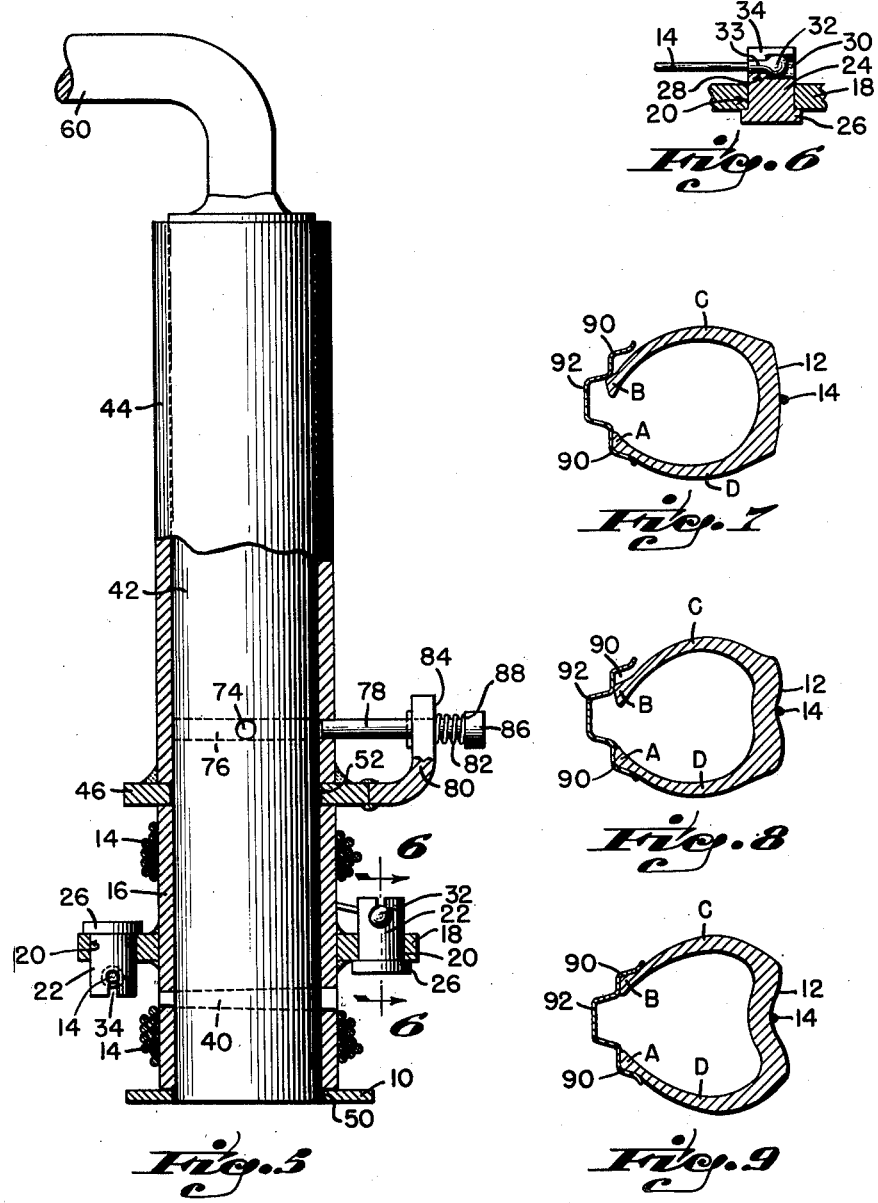

2,791,270
TREAD COMPRESSING TYPE TIRE BEAD SEATING DEVICE

Vernon H. Hildebrant, Morrow, Ohio

Application May 7, 1953, Serial No. 353,463

4 Claims. (Cl. 157—1.21)

This invention relates to a tire tool, and more particularly to a portable tool for circumferentially compressing the central tread portion of a tire casing for thereby forcing outwardly and apart the adjacent edges of the beads of the casing.

An object of the invention is to provide a portable, light-weight, inexpensive, yet highly efficient tool for circumferentially compressing the central tread portion of a tire casing.

Another object of the invention is to provide a tire tool which includes a fixed, annular shoe portion from which a thin, flexible tire encircling loop projects, said shoe including means for enabling the effective length of the loop to be shortened for imparting compressive forces onto the central tread portion of a tire engaged by the shoe and loop.

A further object of the invention is to provide a manually operable tire tool having the hereinabove described characteristics which may be conveniently operated by right or left hand operators, thereby greatly enhancing its utility.

Still a further object of the invention is to provide a tire tool the loop portion of which, when not in use, may be retracted into the shoe for facilitating ease of storage.

Another object of the invention is to provide a tire tool having the hereinabove described characteristics wherein the loop portion comprises a continuous, thin, flexible tension element the opposite ends of which are adapted to be securely though releasably secured to a loop control device secured to and carried by the shoe.

A further object of the invention is to provide a tire tool for circumferentially compressing the central tread portion of a tire casing with means for securely though releasably locking the tool onto the casing after it has been circumferentially compressed.

These and other objects are attained by the means described herein and as disclosed in the accompanying drawings in which:

Fig. 1 is a perspective view of a tire tool embodying the teachings of the present invention in the process of being associated with or applied to the central tread portion of the tire casing.

Figs. 2 and 3 are views similar to Fig. 1, showing the manner in which the central tread portion is circumferentially compressed incident to shortening of the effective length of the tire encircling loop.

Fig. 4 is a perspective view of the tire tool, per se, with the loop portion thereof in a fully retracted position.

Fig. 5 is a sectional view taken on line 5—5 of Fig. 4.

Fig. 6 is a sectional view taken on line 6—6 of Fig. 5.

Figs. 7, 8 and 9 are vertical sectional views taken through the loop, casing and rim portion of the devices illustrated in Figs. 1, 2 and 3, respectively, showing the manner in which the application of a compressive force to the central tread portion of the tire casing is utilized to force the beads apart.

With reference now to the figures, the numeral 10 denotes generally a narrow, elongate, arcuate shoe which is dimensioned to abuttingly engage the central part of tread portion 12 of a tire casing, and the numeral 14 denotes a thin, flexible, continuous, tension element adapted to circumscribingly engage the central portion of the tread of the casing beyond the ends of the shoe. The tension element may be fabricated from rope, cord, wire or cable.

The shoe portion 10 includes suitable means which are manually operable for shortening the effective length of the tension element loop, said means comprising a rotatable sleeve 16 provided with an annular collar 18 having a pair of diametrically aligned apertures 20 for the reception of a pair of duplicate bearing elements 22.

As best illustrated in Figs. 5 and 6, each of the bearing elements includes a tubular body portion 24, one end of which terminates in an outturned flange 26. A bore 28 extends diametrically through the body portion remote from flange 26 to receive tension element 14. In the preferred embodiment of the invention bore 28 is in axial alignment with a larger bore 30 which latter bore is dimensioned to receive the enlarged head 32 of a retaining element 33 permanently secured to the free end of the tension element.

As best illustrated in Fig. 5, a diametric slot 34 is provided in axial alignment with bores 28 and 30, wherein the width of said slot is of a dimension sufficient to slidably receive the tension element 14 when introduced laterally therein.

As best illustrated in Fig. 5, sleeve 16 may be secured as by means of a pin 40 relative to a shaft 42 rotatably mounted within a housing 44 secured to and projecting upwardly from upper element 46 of the shoe assembly. The lower end of shaft 42 may be journaled in an aperture 50 provided through the central portion of shoe 10. It will be noted that the housing 44, which as shown in the drawing is of elongate cylindrical form, in addition to providing an extended firm bearing for the shaft 42, constitutes a handle to be grasped in one hand of the operator of the tool to hold the shoe in position while the handle 60 on the outer end of the shaft is grasped with the other hand to rotate the shaft.

In order to assemble the device shaft 42 may be introduced axially through housing 44, through opening 52 of element 46 and thence into and through sleeve 16 which is disposed between element 46 and shoe 10 and in axial alignment with apertures 52 and 50, respectively. The free end of the shaft will project beyond the lower end of the sleeve and be received within aperture 50 of shoe 10. Accidental or unintentional withdrawal of shaft 42 will be precluded by pin 40 which effectively anchors sleeve 16 relative to shaft 42 while rotatably mounting the shaft relative to the shoe assembly.

As illustrated in Figs. 4 and 5, opposite ends of the tension element 14 are secured to bearing elements 22 one each on opposite sides of flange 18, whereby rotation of handle 60, which is secured to, if not an integral part of, shaft 42, will result in shortening the effective length of the tension element.

Preferably a pair of rollers 62 and 64 are provided adjacent the opposite ends of shoe 10, said rollers serving to guide the tension element relative to the shoe. A support element 66 spanningly engages and interconnects front and rear plates 68 and 70, which plates spanningly engage and interconnect shoe 10 and element 46, said support element being interposed between roller 64 and sleeve 16 for assisting in guiding the tension element onto the sleeve between shoe 10 and collar 18. A second support member 72 spanningly engages and interconnects plates 68 and 70, said support being located between roller 62 and those portions of sleeve 16 between collar 18 and element 46.

With reference now to Fig. 5, it will be noted that shaft 42 may be provided with a pair of diametrically disposed through bores 74 and 76, which are adapted to be selectively located in axial alignment with lock pin 78 secured to and carried by bracket 80 extending from and integral with element 46. A spring 82 may surround those portions of pin 78 between face 84 of bracket 80 and face 88 of pin head 86 for thereby normally and yieldably urging the pin outwardly of and beyond shaft 42.

In operation of the tool the tension element 14 is first looped over the central tread portion of a tire, note Fig. 1, with the shoe spaced therefrom. The operator by then turning upon crank 60 will shorten the effective length of the loop for thereby drawing shoe 10 toward and into abutting relationship with the central tread portion of the tire, as illustrated in Fig. 2. Further turning of crank 60 will result in additional shortening of the effective length of the loop for thereby uniformly and circumferentially compressing the central portion of the tread as illustrated in Fig. 3.

With reference now to Fig. 7, it will be noted that no compressive force is exerted on the central portion of the tread during those periods of time when the tension element is being initially associated with the tire, as in Fig. 1. However, as tension is initially applied to element 14, as in Fig. 2, the central tread portion will be initially compressed, as in Fig. 8, for thereby initially shifting bead B from the position illustrated in Fig. 7 away from bead A to the position illustrated in Fig. 8, it being noted that bead B has been shifted outwardly toward the annular recess 90 of rim 92.

The additional application of circumferentially compressing forces to the central portion of the tread incident to shortening of the effective length of the tension element, as in Fig. 3, will cause the side walls C and D of the tire casing to be swung apart about the point of contact of the tension element 14 with the central portion tread 12 for thereby shifting bead B further from bead A and into seating relationship with annular recess 90.

The tire casing may be maintained in the circumferentially compressed positions illustrated in Figs. 3 and 9 by merely introducing pin 78 into one or the other of bores 74 and 76 of shaft 42 for thereby locking the tool onto the tire for enabling an operator to inflate the tire and make certain that a desired sealing effect has been effected between adjacent faces of the rim and beads A and B. The device may then be removed by releasing the pin 78 and turning shaft 42 for lengthening the effective length of the loop.

As best illustrated in Fig. 4, tension element 14 may be neatly wound on sleeve 16 when the device is not in use for disposing the loop in substantial straight line relationship between pulleys 62 and 64, thereby providing a compact unit which takes a minimum of storage space.

It will be noted that elements 22 are free to rotate relative to collar 18 and that the device may be actuated by turning shaft 42 either to the right or to the left.

It has been found that the subject tire tool is ideally suited for mounting the so-called tubeless tires onto rims. Heretofore a very real and serious problem has existed when efforts have been made to properly seat the beads A and B of a tire casing in their respective annular channels of a rim. By using the subject tool the beads are easily seated on the rim without damage to the tire and with a minimum of time and effort on the part of the operator.

It should be understood that various changes and modifications in the structural details of the device may be made, within the scope of the appended claims, without departing from the spirit of the invention.

In conclusion it will be noted that shoe 10 is dimensioned to abuttingly engage a segment of the central tread portion of a tire casing, the balance of the central tread portion being engaged by the thin, flexible tension element 14.

In the preferred embodiment of the invention the overall width of shoe 10 is 25% or less of the overall width of the tread portion 12 of the tire casing, and the width of the tension element 14 is less than 5% of the tread width. As the loop is shortened to exert a compressive force on the central tread portion, the tension element 14 will freely slip over and relative to the outer tread surface thereby preventing transverse buckling or wrinkling of the casing incident to the application of a circumferential compressive force to the central tread portion.

What is claimed is:

1. A tire tool comprising a narrow, elongate, arcuate shoe dimensioned to abuttingly engage a segment of the central tread portion of a tire casing, a thin, flexible, continuous, tension element extending from opposite ends of and forming a closed loop with said shoe, said loop adapted to engage the central tread portion of a tire casing between opposite ends of the shoe, a rotatable sleeve secured to and carried by the arcuate shoe, a flange projecting radially from the sleeve and intermediate its length, a pair of diametrically disposed bearing elements rotatably secured to and projecting from opposite sides of the flange, means securing the ends of the tension element to each of said bearing elements, and means for rotating the sleeve for winding opposite ends of the tension element in different directions on opposite sides of the flange for changing the effective length of the loop defined by the said tension element.

2. A tire tool comprising a narrow elongate arcuate shoe dimensioned to abuttingly engage a segment of the central tread portion of a tire casing, a thin flexible continuous tension element extending from opposite ends of and forming a closed loop with said shoe, said loop adapted to engage the central tread portion of a tire casing between opposite ends of the shoe, a shaft mounted for rotation on the shoe and extending radially outwardly therefrom, said shaft having a handle at its outer end for rotating the same, an elongate tubular part fixed on the shoe and extending radially outwardly therefrom, said tubular part encircling said shaft and being dimensioned to constitute a handle to be grasped in one hand to hold the shoe in position while the handle of the shaft is grasped with the other hand to turn the shaft, means on the lower part of the shaft outwardly of the shoe connecting opposite ends of the tension element with said shaft, whereby rotation of the shaft will move said element thereabout for changing the effective length of the element.

3. A tire tool comprising a narrow elongate arcuate shoe dimensioned to abuttingly engage a segment of the central portion of a tire casing, a thin flexible tension element extending from opposite ends of and forming a closed loop with said shoe, said loop adapted to engage the central tread portion of a tire casing between opposite ends of the shoe, a frame on the shoe at the outer side thereof intermediate its ends, said frame including a top plate spaced outwardly from the outer face of the shoe, an elongate cylindrical tubular part extending radially outwardly from said top plate and fixedly secured thereto, a shaft extending radially outwardly from the shoe, said shaft extending through said top plate within said elongate cylindrical tubular part and being supported for rotation thereby, the shaft having a handle at its outer end for turning the same, said handle being disposed beyond the outer end of said elongate tubular part, a sleeve on the inner end of the shaft disposed between the outer face of the shoe and said top plate, means detachably securing said sleeve to the shaft for rotation therewith, and means securing opposite ends of the tension element to the sleeve whereby rotation of the shaft and sleeve will wind said tension element around the sleeve for changing the effective length of the tension element.

4. A tire tool of the construction defined in claim 3 and which has means for releasably locking the shaft relative to the radially extending elongate tubular part, said locking means comprising a diametrically disposed bore in the shaft, a bracket on the top plate of the frame, the bracket having a portion extending alongside an inner end portion of the elongate tubular part, and a pin slidably mounted in said bracket portion for movement transversely of the tubular part to move the inner end portion of the pin through an aperture in the tubular part into engagement with the transverse bore of the shaft.

References Cited in the file of this patent

UNITED STATES PATENTS

| | | |
|---|---|---|
| 749,250 | Zuck | Jan. 12, 1904 |
| 1,200,706 | Brost | Oct. 10, 1916 |
| 1,966,580 | Bull | July 17, 1934 |
| 2,321,930 | Murray | June 15, 1943 |
| 2,684,112 | Coats | July 20, 1954 |

FOREIGN PATENTS

| | | |
|---|---|---|
| 4,118 | Great Britain | Dec. 15, 1873 |